May 23, 1967  J. L. ANECKI  3,320,990

AUTOMATIC FOOD-SLICING MACHINE

Filed May 26, 1964  4 Sheets-Sheet 1

May 23, 1967 J. L. ANECKI 3,320,990
AUTOMATIC FOOD-SLICING MACHINE
Filed May 26, 1964 4 Sheets-Sheet 4

Inventor
Jozef Longin Anecki
By Dowell Dowell
Attorneys

United States Patent Office 3,320,990
Patented May 23, 1967

3,320,990
AUTOMATIC FOOD-SLICING MACHINE
Jozef Longin Anecki, Taplow, England, assignor to Lan-Elec Limited, Slough, England, a British company
Filed May 26, 1964, Ser. No. 370,287
5 Claims. (Cl. 146—102)

This invention relates to automatic food-slicing machines, i.e., those in which the food hopper carriage is connected, through a more or less complex mechanical linkage, with a motor so that when the motor is operated the hopper carriage is caused to reciprocate adjacent to a rotating cutter blade.

It is an object of the invention to provide an automatic food slicing machine having means whereby, when the switch for the motor driving the hopper of the machine is opened, the mechanical linkage between said motor and the hopper carriage is broken so that the carriage can be reciprocated manually.

It is a further object to provide an arrangement so that when the switch is closed and the machine is set for automatic operation, both the power supplied to the hopper motor and the mechanical linkage between the motor and the hopper carriage are re-made.

In a preferred construction a pickup hinged to the hopper carriage of the machine engages a part driven by the motor when the machine is set for automatic (power driven) operation. Alteration of the switch setting, to manual operation, breaks the electrical supply to the motor and turns the pickup about its hinge out of engagement with the driven part, the pickup being held, out of engagement until the machine is reset for automatic operation.

The pickup may be biased into enforced engagement with the driven part in order to reduce the possibility of its jumping out of that engagement during automatic operation of the machine. In addition, where the motion of the driven part is reciprocal, it is advantageous to render the pickup slightly resilient in the direction parallel to the motion of the carriage in order to mitigate the effect of the stroke reversals of the driven part which it engages.

An embodiment of an automatic food slicing machine in accordance with the invention will now be described by way of example with reference to the accompanying drawings in which.

The food slicing machine comprises essentially a rotatable cutter blade 2 which is driven by a motor 4. Food to be sliced is carried in a hopper 6 which is arranged to be reciprocated across the rotating blade 2.

Figure 3:
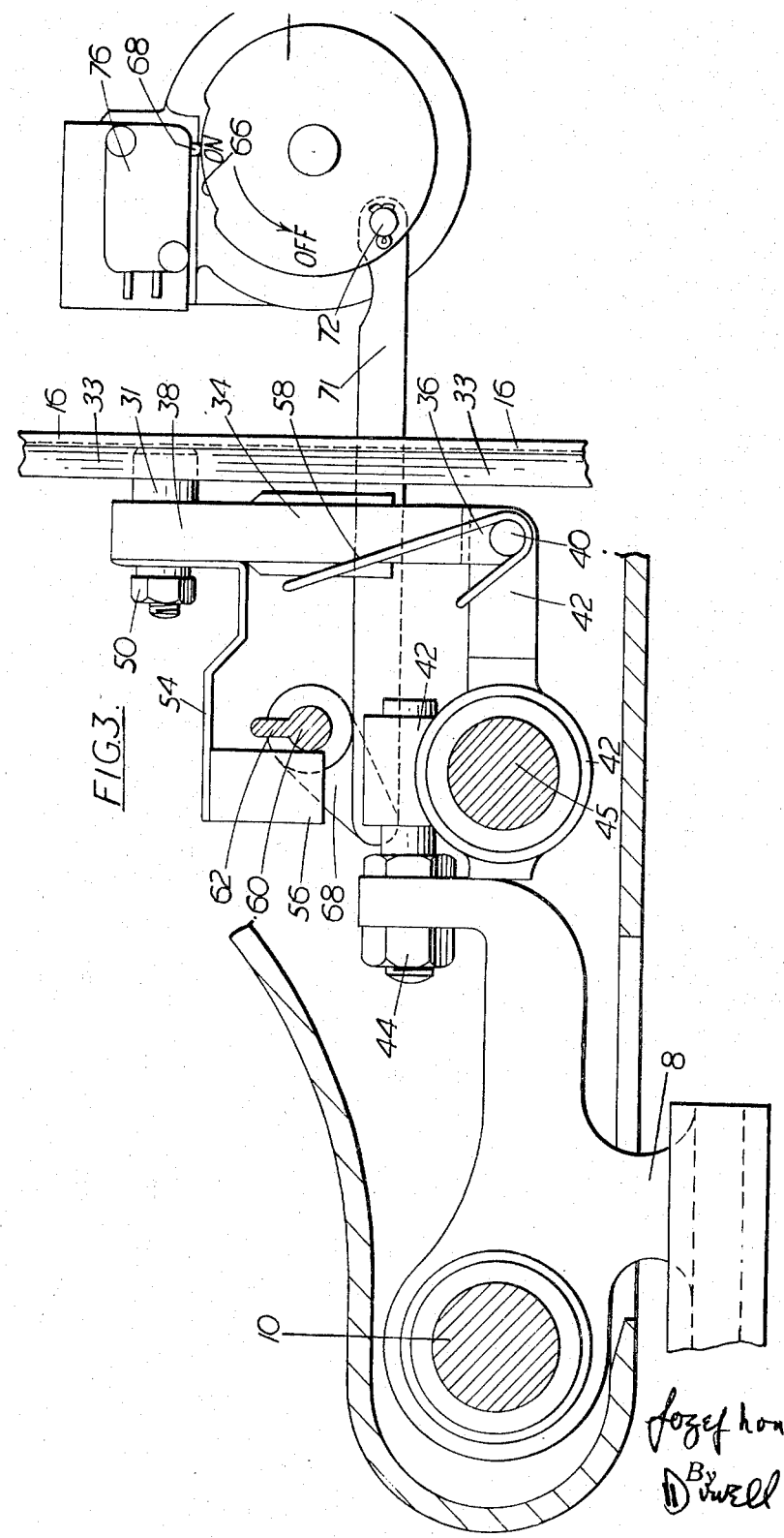
FIGURE 3 is a section on the line III—III of FIGURE 2.

The hopper 6 is carried by a carriage 8 (FIG. 3) which is mounted for reciprocation on a rod 10 within the casing of the machine (see FIGURE 3).

When the machine is set for manual operation the reciprocation can be effected by means of a handle 12 secured to the hopper. When the machine is set for automatic operation the hopper carriage is reciprocated by means of a motor 14 through a grooved pivoted arm 16 and a "pickup" device 18.

The motor 14 rotates a crank arm 19 through gears contained in a gear box 20. The crank arm 19 is connected to one end of the arm 16 through a connecting lever 22, the pivotal connection between the lever 22 and the arm 16 being made on a slide block 24 which is arranged to reciprocate along a shaft 26. The arm 16 is pivoted between its ends about a pivot 28 carried on a slide block 29 carried by a crank arm 30 secured to the machine frame at 32. The means for adjustment of the position of the pivot 28 relatively to the arm 16 thus altering the stroke of the arm 16 and hence the stroke of the hopper, forms the subject of my patent application No. 370,286 filed May 26, 1964. The outer end of the arm 16 is formed with a groove 33 which is adapted to engage over a peg 31 on the pickup device 18 when the hopper is to be reciprocated automatically.

Figure 2:
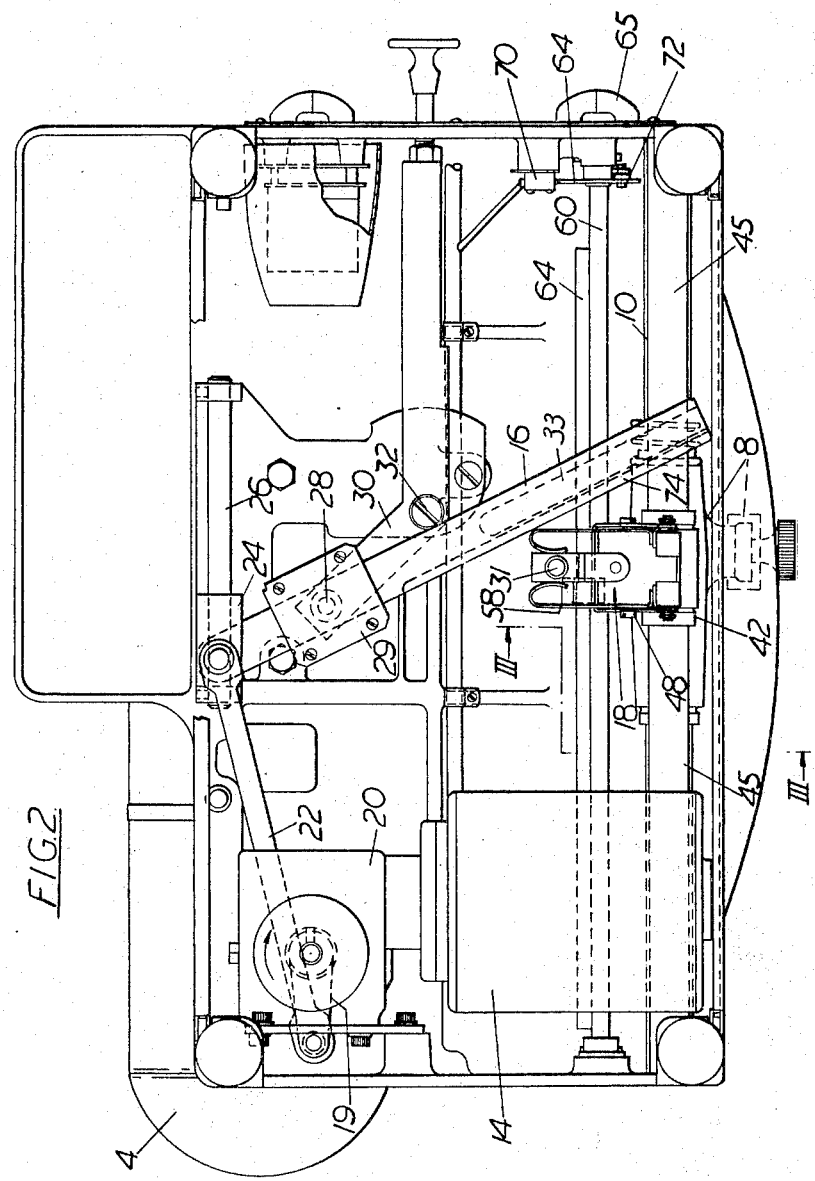
FIGURE 2 is an underneath plan view of the machine.

It will be appreciated that when the motor 14 is running the outer end of the arm 16 is caused to reciprocate arcuately in the plane of FIGURE 2.

Figure 4:
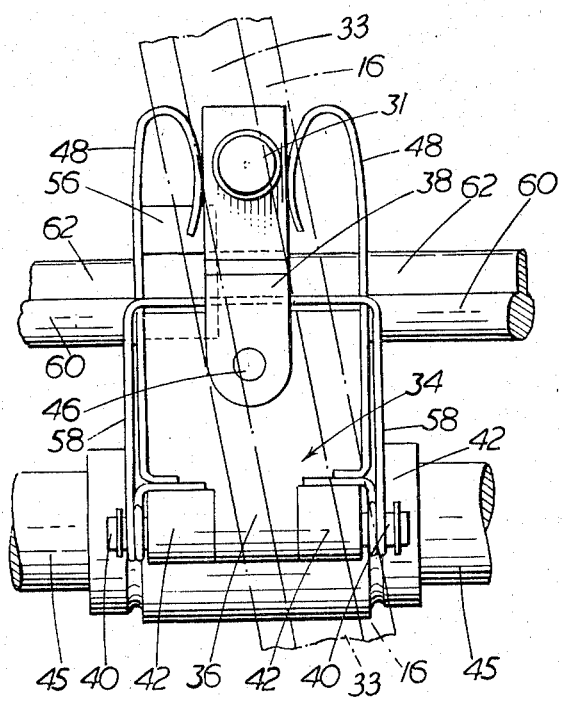
FIGURE 4 is a detail view of the connecting part between the hopper carriage and the motor drive.

The pickup device generally indicated at 18 comprises a block 34 formed with a tongue 36 and carrying an arm 38. The tongue 36 is hinged by a pin 40 to a member 42 attached to the hopper carriage 8 by means of a nut and bolt 44 and arranged to slide along a rod 45. The arm 38 is pivoted in the block 34 by a pin 46 (FIG. 4) and is resiliently supported against pivotal movement around the pin 46 by two leaf springs 48 attached to the block 34. The arm 38 carries on one face the peg 31 which is held in place by a nut 50 which also serves to secure a bracket 54 carrying a roller 56 on the opposite face of the arm 38.

When the machine is operating automatically the peg 31 seats in the groove 33 in the arm 16 and is held in enforced engagement with the arm by a mousetrap spring 58. The direction of motion of the hopper carriage 8 changes smoothly with the stroke reversals of the arm 16 due to the springs 48, which give slightly when the food hopper carriage 8 and the arm 16 are tending to move in opposite directions and permit a small pivotal movement of the arm 38 about the pin 46. The "pickup" device therefore acts as a resilient coupling.

When the machine is to be operated manually the peg 31 is lifted out of the groove 33 in the arm 16, against the action of the spring 58, by axial rotation of a camshaft 60 the cam face 62 of which bears against the roller 56, the pickup 18 being thus turned as a unit about the hinge pin 40.

Figure 1:
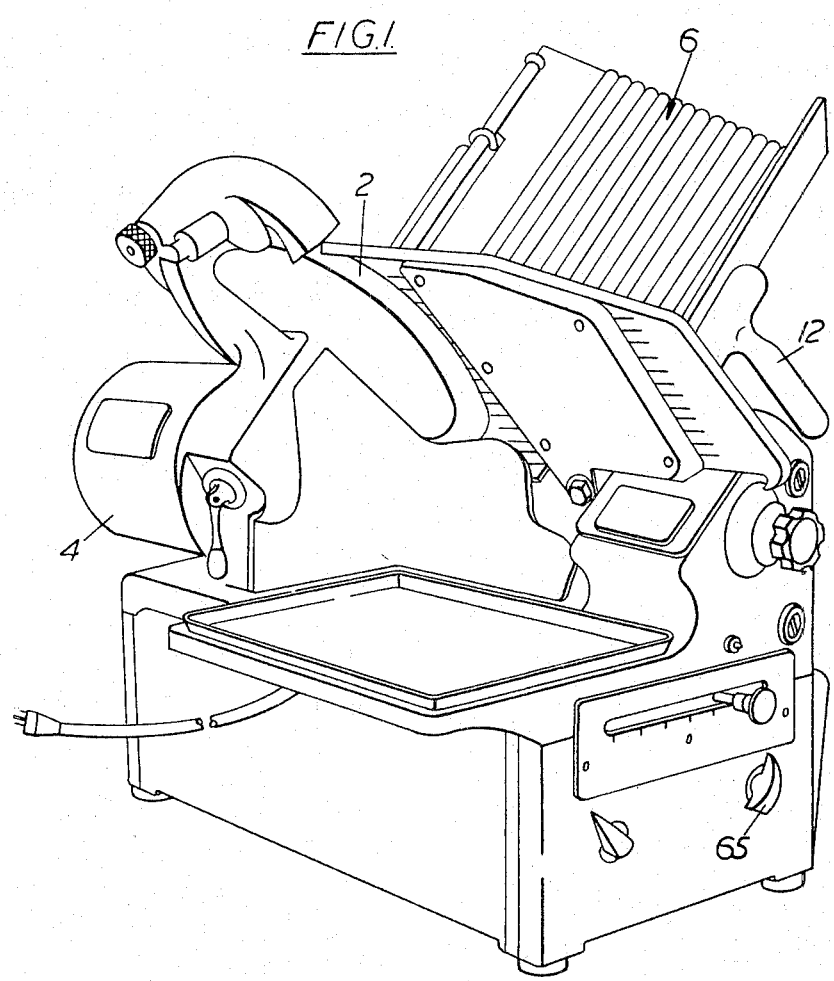
FIGURE 1 is a perspective view of the food slicing machine.

The machine is set for either manual or automatic operation, by a control switch which essentially comprises a cam disc 64 (FIG. 3) connected to a lever 65 (FIG. 1) on the exterior of the machine casing. The cam disc has an indentation 66 in one part of its periphery. The spring-loaded actuating element 68 of a microswitch 70, which controls the power supply to the hopper motor 14, bears on the periphery of the disc. The switch operates to start the motor only when the element 68 projects into the indentation 66 and switches off the motor 14 when the element 68 rides onto the periphery of the cam disc 64 and out from the indentation 66.

The camshaft 60 is coupled, through a lever 68 (FIG. 3), with a connecting rod 71 which is pivotally attached to the periphery of the cam disc 64 at 72. The point 72 is so selected in relation to the position of the indentation 66 that when the machine is set for automatic operation, with the element 68 projecting into the indentation 66, the cam face 62 of the camshaft 60 is held out of engagement with the roller 56 so that the peg 31 is held in the groove 33 of the reciprocating arm 16.

As the cam disc 64 is rotated to change the operation of the machine from automatic to manual the element 68 is forced out of the indentation 66 to break the electric supply to the motor 14 and the peg 31 lifted out from the groove 33 due to the roller 56 bearing against the cam face 62. The cam face 62 extends parallel to the shafts 10 and 45 so that as the hopper carriage 8 is manually reciprocated on the shaft 10 the roller 56 rolls upon the cam face 62 and the pickup 18 is held throughout the stroke, in the disengaged position shown in FIGURE 2.

When the peg 31 is able to engage in the groove 33 after the machine has been operated manually and when it is desired to commence automatic running, by turning the lever 65 in the direction to cause the cam face 62 of the shaft 60 to disengage from the roller 56. The peg 31 then rides over a tapered edge 74 of the arm 16 into the groove 33.

I claim:

1. An automatic food slicing machine comprising a rotatable cutter blade, a motor to drive said blade, a hopper to receive food mounted for reciprocation past said blade, a hopper motor to drive said hopper past said cutter blade, a switch controlling the power supplied to the hopper motor, an operating device for said switch and a lever pivotally connected to said operating device, said operating device comprising a disc so arranged that when moved angularly to the position in which the power supplied to the hopper motor is cut-off by the switch, it also moves said lever to break the mechanical connection between the hopper motor and the hopper whereby the food hopper can be reciprocated manually.

2. An automatic food slicing machine as claimed in claim 1 in which the mechanical connection between the hopper motor and the hopper comprises a grooved arm and a peg engaging in the groove of the arm.

3. An automatic food slicing machine comprising a rotatable cutter blade; a motor driving said blade; a hopper adapted to receive food and mounted for reciprocation past said cutter blade; a second motor adapted to drive said hopper past said cutter blade; a switch controlling the power supplied to the second motor; an operating device for said switch arranged so that when moved to the position in which the power supplied to the second motor is cut-off by the switch, it also acts to break the mechanical connection between the second motor and the hopper whereby the hopper can be reciprocated manually; the said switch operating device comprising a disc, angular movement of which is arranged to operate the switch; a cam shaft disposed adjacent to the hopper; a lever having one end pivoted to the disc and the other end connected to said cam shaft; the drive to the hopper comprising a linkage including a grooved arm oscillated by the second motor, and a peg operated by said cam shaft and in one position of the cam shaft engaging in the groove in the said arm, said peg being carried by a second arm hinged about an axis parallel to the axis of reciprocation of the hopper; and means for biasing the peg to a position in which it engages in the groove of the said arm, said peg being movable out from said groove against said bias by means of the said cam shaft when actuated by said lever.

4. An automatic food slicing machine as claimed in claim 3 in which the said cam shaft extends parallel to, and over the greater extent of, the amplitude of reciprocation of the hopper, so that said peg can be lifted from the groove irrespective of the position of the hopper.

5. An automatic food slicing machine as claimed in claim 3 in which the said peg arm is also mounted for movement about an axis perpendicular to that of the hopper movement and is biased to a position substantially perpendicular both to said hopper movement axis and said peg arm axis, by means of two springs.

References Cited by the Examiner
UNITED STATES PATENTS

| 2,275,527 | 3/1942 | Hirsch | 146—102 |
| 2,459,200 | 1/1949 | Teague et al. | |
| 2,663,341 | 12/1953 | Grove. | |
| 2,912,026 | 11/1959 | Scharfen | 146—102 |

WILLIAM W. DYER, Jr., *Primary Examiner.*

W. GRAYDON ABERCROMBIE, *Examiner.*